United States Patent
Langley

Patent Number: 5,621,656
Date of Patent: Apr. 15, 1997

[54] ADAPTIVE RESONATOR VIBRATION CONTROL SYSTEM

[75] Inventor: Andrew J. Langley, Welwyn, Great Britain

[73] Assignee: Noise Cancellation Technologies, Inc., Linthicum, Md.

[21] Appl. No.: 318,630

[22] PCT Filed: Apr. 15, 1992

[86] PCT No.: PCT/US92/03024

§ 371 Date: Oct. 11, 1994

§ 102(e) Date: Oct. 11, 1994

[87] PCT Pub. No.: WO93/21687

PCT Pub. Date: Oct. 28, 1993

[51] Int. Cl.$^6$ .................................................. H03B 29/00
[52] U.S. Cl. .................... 364/508; 364/148; 364/431.08; 364/574; 364/578; 364/484; 73/611; 73/648; 73/649; 73/662
[58] Field of Search ...................... 364/484, 495, 364/508, 551.01, 571.01, 572, 724.01, 574, 578, 431.08, 148; 73/611, 648, 649, 662

[56] References Cited

U.S. PATENT DOCUMENTS

| | | | |
|---|---|---|---|
| 2,835,735 | 5/1958 | Moen | 179/1 |
| 4,710,656 | 12/1987 | Studer | 310/51 |
| 4,819,182 | 4/1989 | King et al. | 364/508 |
| 4,947,435 | 8/1990 | Taylor | 381/71 |
| 5,003,819 | 1/1991 | Koopmann | 73/146 |
| 5,091,953 | 2/1992 | Tretter | 351/71 |
| 5,115,881 | 5/1992 | Meynier | 181/106 |
| 5,233,540 | 8/1993 | Anderson et al. | 364/508 |
| 5,347,586 | 9/1994 | Hill et al. | 381/71 |
| 5,355,417 | 10/1994 | Burdisso et al. | 351/71 |
| 5,367,612 | 11/1994 | Bozich et al. | 395/22 |
| 5,396,414 | 3/1995 | Alcone | 364/148 |
| 5,418,857 | 5/1995 | Eatwell | 381/71 |
| 5,426,720 | 6/1995 | Bozich et al. | 395/22 |

Primary Examiner—Emanuel T. Voeltz
Assistant Examiner—Hien Vo

[57] ABSTRACT

This invention relates to control systems for the control of noise and vibration. Resonators with adjustable properties are used in conjunction with an electronic control system to change the noise or vibration in a structure. The invention relates particularly to the control of quasi-periodic noise or vibration comprising one or more harmonics by using one or more adaptive resonators.

14 Claims, 2 Drawing Sheets

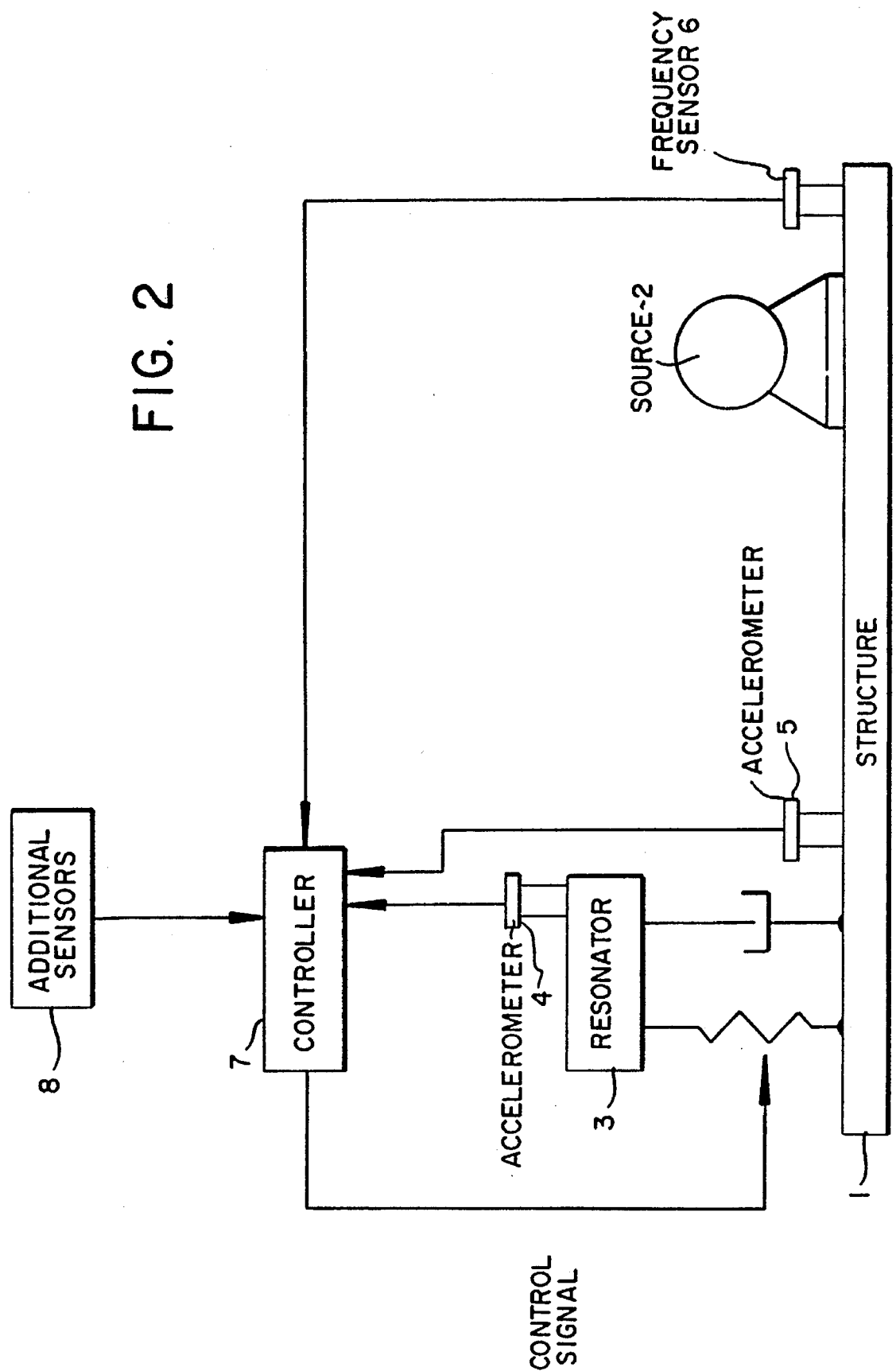

ADAPTIVE RESONATOR VIBRATION CONTROL SYSTEM

BACKGROUND OF THE INVENTION.

Many machines, such as internal combustion engines, generate unwanted noise and vibration. The vibration typically comprises a fundamental component whose frequency is, for example, the potation frequency of the machine (this is called the first harmonic), plus one or more additional harmonics at frequencies that are integer multiples of the first.

Occasionally, the speed of a machine is more-or-less constant and it is then possible to reduce vibration caused by the machine with a "tuned damper", or "resonator" (the two terms are used interchangeably here). A tuned damper is a resonant system that is attached to a point where vibration is to be reduced, and it is built to resonate at or close to the frequency of the vibration. Purely passive tuned dampers have fixed characteristics, and will work only close to the frequency for which they are designed. At the resonance frequency, the input impedance of the resonator (defined as the ratio of a generalized force applied by the resonator at the point of attachment to a generalized velocity at the same point) will be exceptionally high (or in some cases, such as a Helmholtz resonator in a duct, exceptionally low: see the description in L E Kinsler, A R Frey, A B Coppens, J V Sanders "Fundamentals of Acoustics" 3rd ed. Wiley and Sons 1982 pp 241–242).

As an example of a tuned damper, a mass suspended on a spring will resonate at a characteristic resonance frequency. If the spring is attached to a structure vibrating at this resonance frequency, the amplitude of vibration of the structure at that point will be reduced (and as a consequence, the suspended mass will vibrate strongly). Similar effects can be described for acoustic resonators (e.g. Helmholtz resonators; L E Kinsler, A R Frey, A B Coppens, J V Sanders "Fundamentals of Acoustics" 3rd ed. Wiley and Sons 1982. pp 225–228) where sound pressure is the vibration to be reduced.

The disadvantage with passive tuned dampers is that they will work only close to one frequency, and if the frequency of the vibration drifts, the damper will cease to be effective. It is obvious that a damper whose characteristics can be adjusted with the frequency of vibration to be reduced would be an advantage. Implicit here is the concept that the period of the vibration varies only slowly, so that it takes many cycles of the vibration for the period of the vibration to change significantly (ie. a "quasi-periodic" system).

There have been many schemes for the adjustment of tuned dampers. Typically, the resonance frequency of the damper is changed by mechanically altering a stiffness or mass. The mechanism adjusting the damper senses the current frequency of the vibration and tries to adjust the damper resonance frequency to be the same. The main problem with such systems is that any error in the tuning of the damper can be extremely detrimental to performance, and there is no way of detecting this in a simple "open-loop" control system.

In more complicated systems, a "closed-loop" feedback control system is used to ensure that the damper is always kept close to resonance at the frequency of the unwanted vibration. These systems require additional sensors to make them work, but the performance is improved.

There is an important distinction between the systems described here, with resonators whose properties can be adjusted (called "adaptive-passive" systems) and so-called "active control systems". In an active control system, the outputs from the controller change on a timescale characteristic of the vibration itself, and these outputs usually drive actuators vibrating at the same frequency as the vibration (see, for example, P A Nelson and S J Elliott "Active Control of Sound" Academic Press 1992 and G B B Chaplin and R A Smith, U.S. Pat. No. 4,568,118, 1986). In the adaptive-passive system of the invention, the outputs of the controller vary on the much slower timescale characteristic of changes in the frequency of vibration. This reduces the computational requirements of the controller considerably. Furthermore, the power required to drive the actuators of an active control system is usually considerable, whereas in an adaptive-passive system, the power used to, adjust the resonator characteristics is usually negligible.

An ideal adaptive-passive system would be able to control components of vibration at several different frequencies (usually the first and subsequent harmonics of a quasi-periodic vibration), whilst maintaining the performance of the system as the frequencies change.

DISCUSSION OF THE SELECTED PRIOR ART

Sato and Matsuhisa (Internoise '90 proceedings, pp 1305–1308, "Semi-active noise control by a Resonator with Variable Parameters" published by the Noise Control Foundation) and Izumi, Takami and Narikiyo (International Symposium on Active Control of Sound and Vibration April 91, pp 281–266 "Muffler System Controlling an Aperture Neck of a Resonator" published by the Acoustical Society of Japan) describe feedback control systems for a single tuned damper of variable characteristics.

Both of these papers describe the control of a single tuned damper only. The damper is a Helmholtz resonator, and the control systems use the sound pressure level inside the resonator, and just outside it, as inputs. Both control systems aim to adjust the resonators such that the phase shift between the two inputs is 90°, when the resonator will be at resonance.

Sato and Matshuhisa use a two-stage control system that estimates the frequency of the sound from the inputs and uses an open-loop control system initially to tune the damper close to that frequency. A second stage of closed-loop control then iterates to tune the damper precisely to the correct frequency, although there is no description of the control algorithm. This system must derive the vibration frequency initially from one of the inputs, which can be difficult if the fundamental period of vibration is changing and the vibration comprises several harmonics all of which will be changing differently. Also, the control system does not allow several tuned dampers to be tuned to reduce several different frequencies in the sound simultaneously.

Izumi, Takami and Narikiyo describe a different control system. However, if, for example, the vibration comprises several harmonics, there is no guarantee that the system they describe will work in general, because their phase-detection system makes the fundamental assumption that the vibration comprises only the frequency to be controlled. It also does not allow several tuned dampers to be tuned simultaneously to different components of the vibration.

SUMMARY OF THE INVENTION

The invention provides for a noise or vibration control system comprising the following features (a) one or more resonators of variable characteristics that can be tuned by control signals to the same or different resonance frequencies (b) sensors attached to parts of the resonators and the structure to which the resonators are attached in order to monitor the tuning of the resonators (c) sensors attached to the source or the structure (or any other suitable location) that can be used to determine the frequencies of the noise or vibration (d) optional additional sensors that are used to monitor other factors that affect the resonators' performances (such as temperature)

(e) a control system that has as inputs the sensors, and as outputs, signals to change the resonance frequencies of the resonators wherein the control system incorporates an algorithm to tune the resonators close to selected frequencies in the noise or vibration, and to keep them tuned as those frequencies drift (or as other factors affecting resonator performance change).

Accordingly, it is an object of this invention to provide a vibration control system having one or more resonators of variable characteristics that can be tuned by control signals to the same or different resonance frequencies.

It is another object of this invention to provide a vibration control means having sensors attached to parts of the resonators and the structure to which the resonators are attached in order to monitor the tuning of the resonators A still further object is to have a vibration control system with sensors attached to the source or the structure (or any other suitable location) that can be used to determine the frequencies of the noise or vibration A still further object is the provision of vibration control with optional additional sensors that are used to monitor other factors that affect the resonators' performances (such as temperature)

Finally, it is an object to provide a control system that has as inputs the sensors, and as outputs, signals to change the resonance frequencies of the resonators wherein the control system incorporates an algorithm to tune the resonators close to selected frequencies in the noise or vibration, and to keep them tuned as those frequencies drift.

Preferably, the control system incorporates mathematical models of the resonators that are used to enhance the performance of the control system. Preferably, these models are continuously updated and refined by the control system as it operates.

Reference is had to the accompanying drawings in which FIG. 1 illustrates the overall structure of the invention, and FIG. 2 illustrates a particular structure of the invention.

DETAILED DESCRIPTION OF THE PREFERRED EMBODIMENTS

Figure 1:
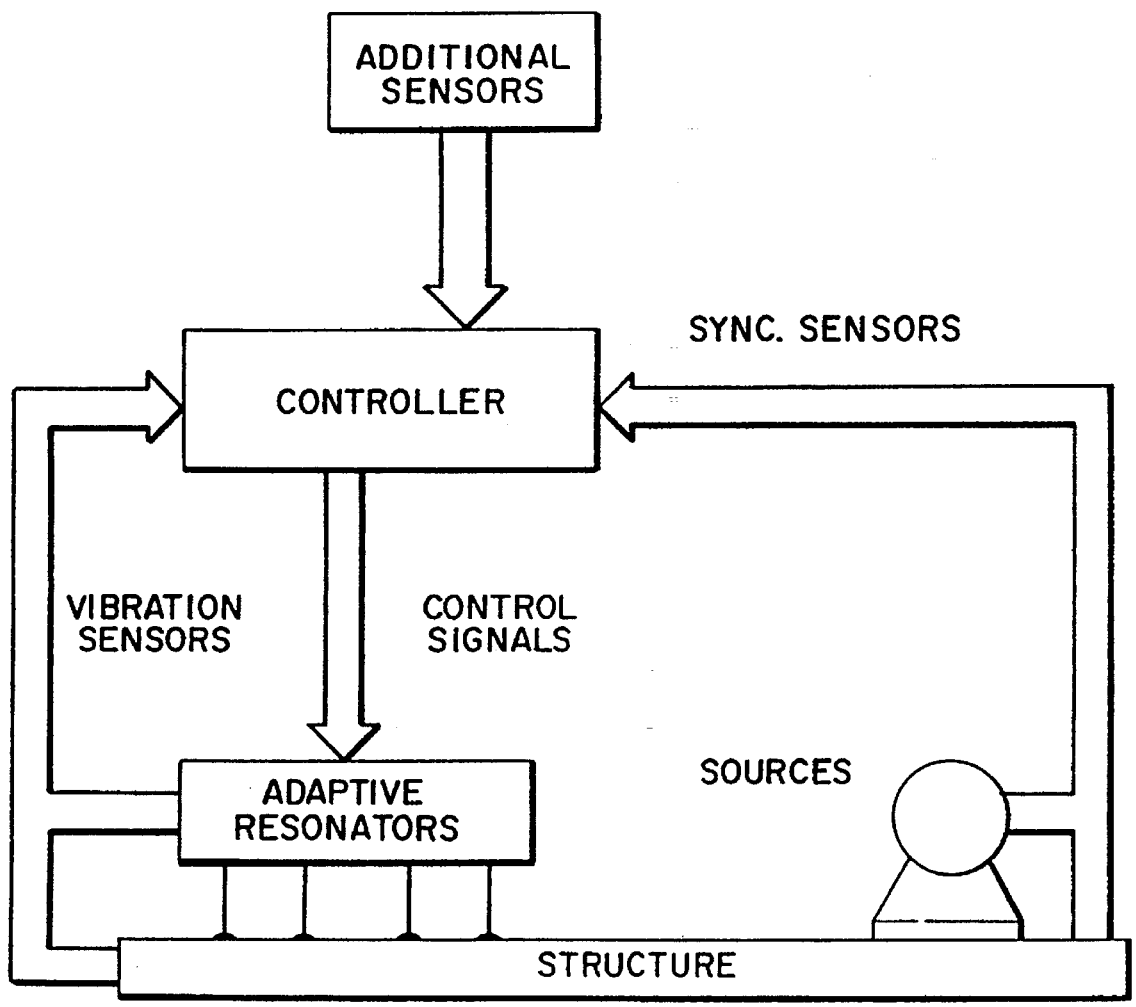

A very simple example of the invention will be used to illustrate the important features. In FIG. 2, a structure 1 is excited by a source 2 vibrating at a variable fundamental frequency of $f_1$. The spectrum of the vibration contains harmonics at $f_1, 2f_1, 3f_1, \ldots$ etc. At a point on the structure where it is desired to reduce the vibration, a spring-mass-damper resonator 3 is attached. It is assumed in this example that the nth harmonic of the fundamental component of the vibration is to be reduced by the damper, so that the aim is to tune the resonator close to $nf_1$, and to keep it tuned as $f_1$ drifts. The "structure" bears the vibration from the source to the resonator, and may be a solid, fluid or gas depending on the application. "Vibration" includes any disturbance in the "structure", including electromagnetic, as the techniques described here can be equally well applied to mechanical or electrical systems.

An accelerometer 4 is attached to the mass of the resonator, and another accelerometer 5 is attached to the structure close to the resonator. The displacement of the mass (as monitored via the accelerometer 4) is denoted $x_m$, and the displacement of the structure (as monitored via the accelerometer 5) is denoted $x_s$. Obviously other types of sensor could be used to measure these displacements. It is immaterial where, in fact, these sensors are mounted provided the resonator's input impedance could be derived from sensors mounted at those points. For example, a force guage mounted on the structure between the structure and the resonator, and an accelerometer also mounted on the structure would also be an acceptable pair of sensors. Note that the choice of example here, with linear motions, does not preclude application of the system to resonators with rotary motion—the principles of operation are the same.

It is assumed that the frequency responses of the sensors are known so that $x_m$ and $x_s$ can be derived from the sensor outputs. The frequency response of the sensor can usefully include any other additional filtering (e.g. analogue band-pass filtering and gain adjustment to improve signal to noise ratios or anti-aliasing). This compensation for the sensor responses can be applied at different points in the system, but it is most efficient to apply the compensation to the coefficients $X_m$ and $X_s$ described below. Typically, the control system will store necessary information about the calibration of the sensors to enable any corrections that are required to be made. In the description below, these corrections are not explicitly stated as it will be obvious to anyone skilled in the art how to compensate for sensor characteristics to derive the quantities needed by the control system.

The aim is to maximize the modulus of the input impedance of the resonator at the nth harmonic of the fundamental of vibration, so that the structure will vibrate less at that frequency at the point of attachment of the resonator. The input impedance is defined here to be the ratio of the force applied by the structure to the resonator and the corresponding velocity of the point of attachment, and it is a function of frequency.

Elementary mechanics will show that the input impedance of the resonator is proportional to the ratio $X_m/X_s$, where $\text{Re}(X_m e^{i\omega t})$ and $\text{Re}(X_s e^{i\omega t})$ are the components in $x_m$ and $x_s$ at angular frequency $\omega$. (Re denotes the real part, $X_m$ and $X_s$ are complex numbers, t denotes time and $i=\sqrt{-1}$). $X_m$ and $X_s$ are themselves functions of $\omega$. For the simple spring-mass-damper model of the resonator, $$\frac{X_m}{X_s} = \frac{1}{1 - \frac{\omega^2/\omega_r^2}{1 + i\omega/(\omega_r Q)}} \qquad (1)$$

Here, $\omega_r$ is the undamped resonance (angular) frequency of the resonator, and Q is the "quality factor". For the spring-mass-damper model the relations $\omega_r^2 = k/m$ and $Q\omega_r = k/\sigma$ apply, where k is the spring stiffness, m the mass and $\sigma$ the damping rate of the damper.

When $Q \gg 1$ (which is usually true) the modulus of $X_m/X_s$ at an angular frequency of $\omega = 2\pi nf_1$ will be a maximum if $\omega_r = 2\pi nf_1$. (This is not exactly true, but the errors are negligible if Q is large enough). Also, there will then be a SO phase difference between $X_m$ and $X_s$ at this frequency.

A frequency sensor 6 in FIG. 2 is provided to detect the fundamental frequency of vibration, $f_1$. The location and type of sensor is preferably chosen to be reasonably immune to the effects of changing the tuning of the resonator. For example, it could be a tachometer signal from a part of the source of vibration such that the output of the tachometer can be used to determine the current fundamental frequency of the source. In some cases, it may be sufficient to use one or more of the sensors mounted on the structure and resonators to derive fundamental frequencies, but it is better if the sensor is insensitive to the effects of tuning the resonators.

The signal from sensor 6 is used by the control system 7 to help to discriminate those components of $x_m$ and $x_s$ at the frequency $nf_1$ in the presence of components at other harmonics of $f_1$ or any other "noise". This discrimination is crucial if the control system is to be able to alter the resonance frequency of the resonator to coincide with $nf_1$ and to maintain this condition as $f_1$ varies. For example, $x_m$ and $x_s$ will normally contain components at all harmonics of $f_1$ up to the highest harmonic below the current resonance frequency of the resonator. Unless the unwanted components can be rejected, there is no guarantee that the resonator will be adjusted to the correct frequency.

The signal from sensor 6 can be used in several different ways to process the inputs from accelerometers 4 and 5. Three examples are given below.

1. Tracking Filter

It is possible to set up a tracking bandpass filter whose centre frequency is adjusted by the signal from sensor 6 to be close to $nf_1$ (e.g. see K Martin and A S Sedra, IEEE Transactions on Acoutics, Speech and Signal Processing Vol ASSP-29 no. 3 June 1981 pp 736–744). The bandwidth of the filter is chosen to reject all unwanted components in the accelerometer signals. Each accelerometer signal is then filtered through a tracking filter (desirably, these filters would be identical) to leave only the signals at a frequency of $nf_1$. One problem with this implementation is that the bandwidth of the filter (expressed in octaves) will have to vary with the number, n, of the harmonic to be controlled. This is because harmonics become more closely spaced (in terms of octaves) as n is increased.

The accuracy with which sensor 6 must detect $f_1$ depends upon the required bandwidth of the filter. If the filter bandwidth must be narrow to remove an unwanted noise component close to $nf_1$, then the accuracy with which the filter's centre frequency is set (by the signal from sensor 6) must clearly be such that the pass-band still includes the frequency $nf_1$. It is immaterial whether the tracking filter is implemented digitally or with analogue electronics.

The output of the bandpass filters will be signals that contain information only at the frequency $nf_1$, as required. In order to extract the values of the complex coefficients $X_m$ and $X_s$, it is convenient to process these signals in one of the two ways described below. Since unwanted components of $x_m$ and $x_s$ have already been removed by filtering, the low-pass filters described for the harmonic filter can have a bandwidth of up to $2f_1$. For the same reason, single FFT or DFT is all that should be required to calculate $X_m$ and $X_s$ as signal averaging will be unnecessary.

The outputs of identical bandpass filters are expected to be $A|X_m|\sin(2\pi nf_1 t+\gamma_m)$ and $A|X_s|\sin(2\pi nf_1 t+\gamma_s)$ where $\gamma_m$ and $\gamma_s$ are phase angles and A is the gain of the filter. Therefore, it would also be possible to estimate $|X_m/X_s|$ and/or $\gamma_m-\gamma_s$ (which is the phase difference between the original components at frequency $nf_1$ when the filters are identical) directly from the filter outputs. For example, peak value and zero-crossing detection could be used, and such a scheme might be computationally more efficient than other methods. The ratio of peak values gives $|X_m|/|X_s|$ directly, and zero-crossings with a positive slope will occur at times $t_k=k/nf_1+\gamma_m/2\pi nf_1$ and $t_k'=k/nf_1+\gamma_s/2\pi nf_1$ (k is an integer). Therefore, the value of $\gamma_m-\gamma_s$ can be deduced from measurement of $t_k-t_k'$.

2. Harmonic Filters

From the sensor 6 it is possible to derive auxiliary signals $\sin(2\pi nf_1 t)$ and $\cos(2\pi nf_1 t)$. For example, this could be done with voltage-controlled oscillators whose inputs would be a signal derived from sensor 6 to generate outputs close to frequency $nf_1$. The signals $x_m$ and $x_s$ then multiplied by $\sin(2\pi nf_1 t)$ and $\cos(2\pi nf_1 t)$ (giving four signals in total), and each of the results is low-pass filtered by filters whose bandwidths are adjusted to reject all the unwanted components in $x_m$ and $x_s$. For example, if other harmonics in $x_m$ and $x_s$ must be rejected, the bandwidths of the low-pass filters should be less than $f_1$. Just as with the tracking filter, the low-pass filters should have bandwidths that are ideally adjusted by the control system as $f_1$ changes in order to maintain rejection of unwanted components in the signals (see G P Eatwell, "Control System Using Harmonic Filters". Copending patent application). Also, the accuracy with which the frequency of the auxiliary signals must match $nf_1$ depends upon the required bandwidth of the low-pass filters: the difference between the true value of $nf_1$ and the frequency of the auxiliary signals derived from sensor 6 must be less than the bandwidth of the low-pass filters.

To see how the magnitude and phase of $X_m/X_s$ (evaluated at a frequency of $nf_1$) are calculated from the four demodulated signals, define $y_{mc}$ and $y_{ms}$ to be the outputs from the process of multiplying $x_m$ by $\cos(2\pi nf_1 t)$ and $\sin(2\pi nf_1 t)$ respectively and then low-pass filtering the results. Similarly, define $y_{sc}$ and $y_{ss}$ for the results of operating on $x_s$. The modulus of $X_m/X_s$ can then be calculated as $$|X_m/X_s|^2=(y_{mc}^2+y_{ms}^2)/(y_{sc}^2+y_{ss}^2)$$

and the phase difference by $$\text{Arg}(X_m/X_s)=\arctan(y_{ms}/y_{mc})-\arctan(y_{ss}/y_{sc})$$

These results are much easier to compute if the control system is implemented digitally, and the whole harmonic filtering scheme is also ideally implemented digitally.

If the bandpass filtering described in (1. Tracking Filter) above has been performed, it is possible to take some short-cuts to computing $\text{Arg}(X_m/X_s)$. For example, the phase-detection scheme of Izumi, Takami and Narikiyo (International Symposium on Active Control of Sound and Vibration April 91, pp 261–266 "Muffler System Controlling an Aperture Neck of a Resonator" published by the Acoustical Society of Japan) which uses balanced synchronous demodulation will work because only one harmonic now appears in the filter outputs, although it is undesirable that the magnitude of one of the signals appears in the result.

The use of the filtered signals to implement a closed-loop control system is described below.

3. Fourier Transform

Another method of using the auxiliary signal from sensor 6 to discriminate against unwanted components in x and x is to use a Fourier transform (D E Newland "An Introduction to Random Vibrations and Spectral Analysis" Longman 1975 pp 33–40). As this would normally be implemented digitally, it is described here in those terms. From the sensor 6 signal, a pulse-train of N pulses per fundamental period of the vibration is derived. (This would be done directly if, for example, sensor 6 were a shaft-encoder giving N pulses per revolution of a shaft in the source rotating at the same frequency as the fundamental frequency of the vibration).

This pulse-train is used to trigger analog-to-digital converters (ADC's) sampling x and x (after such anti-alias filtering as is necessary). Alternatively, the pulse-train can be used to select samples from ADC's triggered by a fixed clock running at a frequency considerably higher that $Nf_1$ (using interpolation/extrapolation if necessary to get the sample value at the occurrence of a pulse, which may lie between two successive samples of the ADC's). In either case, the result of this process is a sequence of samples of $x_m$ and $x_s$, with N samples per fundamental period of the vibration.

To discriminate against noise in $x_m$ and $x_s$ that is not correlated to the pulse-train, successive blocks of N samples of can be averaged. This is synchronous time-domain averaging, and it is only one example of the standard techniques for removing uncorrelated noise from a signal that could be used.

To perform the Fourier transform, one of the standard algorithms can be used if N is a suitable number. (For example, if N is a power of 2, the "Fast Fourier Transform" algorithm can be used; see D E Newland "An Introduction to Random Vibrations and Spectral Analysis" Longman 1975 pp 150–166). It is also possible to perform a Discrete Fourier Transform (see 6. D E Newland "An Introduction to Random Vibrations and Spectral Analysis" Longman 1975 pp 113–124). The result of this process is one or more "Fourier Coefficients", representing the real and imaginary parts of $X_m$ and $X_s$ at one or more of the frequencies $f_1$, $2f_1$. ...$nf_1$. ... $NF_1/2$. (Clearly, the coefficient at $nf_1$ will have to be calculated when this is the harmonic of the vibration that is to be reduced).

Noise in $x_m$ and $x_s$ that is not correlated to the pulse-train can also be reduced by averaging corresponding Fourier coefficients from successive blocks of data (this is frequency-domain averaging, another example of a standard technique).

The use of the Fourier coefficients to implement a closed-loop control system is now described.

The Control System

Once the values of $X_m$ and $X_s$ at the frequency $nf_1$ have been discriminated from other unwanted components, the control system must arrange to adjust the tuning of the resonator accordingly. In the example given above, the modulus of the ratio $X_m/X_s$ is to be maximized, or the phase difference between $X_m$ and $X_s$ is to be kept at 90° as f varies. One way of achieving this goal with a model-based digital control system is described below. In the controller, a gradient-descent algorithm incorporating a model of the resonator is used. The purpose of the model is to permit rapid and accurate estimation of the derivatives of an error function that determines the current performance of the system. The controller can be configured continuously to update its model of the resonator, and to account for additional variables (such as temperature) that affect the system performance.

Equation 1 is a result based on a simple model of the resonator. In practice, this model should be a good approximation at least reasonably close to resonance. If r is defined to be the ratio $X_s/X_m$ evaluated at a frequency of $nf_1$, then equation 1 gives $$r \equiv \frac{X_m}{X_s} = 1 - \frac{\omega^2/\omega_r^2}{1 + i\omega/(\omega_r Q)} \quad (2)$$

The aim of the control system is to adjust $\omega_r$ to minimize $|r|$. $\omega_r$ will be a function of a control parameter $\lambda$. For example, $\lambda$ may be the position of an actuator that changes the stiffness of the spring in the spring-mass-damper resonator. From the current value of $\lambda$, denoted $\lambda_k$, the improved value of $\lambda$ to be set by the controller ($\lambda_{k+1}$) can be calculated by the following equation $$\lambda_{k+1} = \lambda_k - \mu Re\left(r^* \frac{\partial r}{\partial \lambda}\right)_k \quad (3)$$

where $\lambda$ is a scalar multiplier determined by the control system, and an asterisk indicates the complex conjugate. This is the update equation for a gradient-descent algorithm. As it stands, equation 3 is of limited use because the derivative of r with respect to $\lambda$ is not measured (whereas r is). It would be possible to determine value of this derivative by making small perturbations in $\lambda$ and observing the results, but it is better to use the model of resonator to estimate this derivative.

In the current example, equation 2 gives the value of r in terms of the current values of $\omega_r$ and Q. Therefore, an estimate of the derivative is given by $$\frac{\partial r}{\partial \lambda} = \frac{\omega^2}{\omega_r^4(1 + i\omega/\omega_r Q)^2} \cdot \quad (4)$$

$$\left(\frac{\partial \omega_r}{\partial \lambda}\left(2\omega_r + \frac{i\omega}{Q}\right) - \frac{\partial Q}{\partial \lambda}\frac{i\omega\omega_r}{Q^2}\right).$$

Now all of the quantities on the right hand side of equation 4 are either measured, or can be estimated from a model of the resonator. The current value of $\omega$ can be estimated from the auxiliary sensor 8 signal; $\omega_r$ can be estimated from the current value of $\lambda$ and a model of the function relating $\omega_r$ to $\lambda$ stored in the controller. Q can be estimated in a similar fashion. The derivatives with respect to $\lambda$ can also be estimated from the model relationships between $\omega_r$, Q and $\lambda$. The important aspect of equation 4 is that errors in the estimates of the quantities do not become critical around the condition $\omega_r = \omega$. This is very different from r itself which is sensitive to errors around the condition $\omega_r = \omega$: it would be inadvisable to estimate r in the same way as $\partial r/\partial\lambda$, because errors could lead to the wrong sign in the second term on the right hand side of equation 3, and this would prevent the control system converging correctly.

As mother example, consider a variable Helmholtz resonator mounted in a duct to prevent transmission of noise at a frequency of $nf_1$. This system is very similar to the spring-mass-damped described above, but here the aim is to minimize the input impedance (defined as the ratio of sound pressure in the duct outside the neck of the resonator and the particle velocity of the fluid in the neck) at the frequency $nf_1$. It is not difficult to show that this amounts to the minimization of a new error function, $|r|$, defined by $$r = 1 - \frac{\omega}{\omega_r^2} + \frac{i\omega}{\omega_r Q} \cdot \quad (5)$$

r can be derived from measurements of the sound pressure in the duct just outside the neck of the resonator, and inside the cavity of the resonator. As before, r itself should be measured rather than estimated in view of its sensitivity to errors when $\omega_r \cong \omega$. However, the derivative required in equation 3 can safely be estimated in the manner described above via the relation $$\frac{\partial r}{\partial \lambda} = \frac{\partial \omega_r}{\partial \lambda}\frac{\omega}{\omega_r^2}\left(\frac{2\omega}{\omega_r} - \frac{i}{Q^2}\right) - \frac{i\omega}{\omega_r Q^2}\frac{\partial Q}{\partial \lambda} \cdot \quad (6)$$

It should be noted that in some circumstances it may be acceptable to ignore or approximate some of the terms in equations 4 and 6. For example, the last term in equation 6 would normally be very small, and it might be neglected.

It is most appropriate to apply the gradient-descent algorithm when the resonator is already close to resonance. The step-size, $\mu$, should then be scaled approximately as follows $$\mu = \alpha(\omega/Q)/\oplus\partial\omega_r/\partial\lambda|$$

where $\alpha$ is a constant independent of $\omega$ and the resonator performance, and the derivative is evaluated at the current value of $\lambda$. The best value for $\alpha$ can be selected by experiment.

Initially, it may happen that the resonator is far from resonance. Two schemes can then be applied to bring the resonator close enough to resonance to apply the gradient-descent algorithm. First, $\omega$ is known from the sensor 8 signal, and an estimate of $\omega_r$ is known from the current value of $\lambda$ and the relation between $\lambda$ and $\omega_r$ which is stored by the controller. Therefore, it is simple to adjust $\lambda$ in one step to bring $\omega_r$ much closer to $\omega$. However, the relation between $\omega_r$ and $\lambda$ will in general not be known very accurately since, for example, the relation may depend upon unobserved variables such as temperature.

The second scheme, a measurement-based one-step algorithm, estimates $\omega_r$ directly by solving equation 2 for $\omega_r$, given the current (measured) values of $\omega$ and r, and an estimate of Q. This determines the required change in $\omega_r$, and an update of $\lambda$ can be computed via $$\lambda_{k+1} = \lambda_k + \beta(\omega - \omega_r)/\frac{\partial\omega_r}{\partial\lambda}$$

for example. The derivative is evaluated at a value of $\lambda$ corresponding to a frequency somewhere between $\omega$ and $\omega_r$, and $\beta$ is a positive control parameter that would usually be somewhat less than 1. A value of 1 tries to converge to the correct value of $\lambda$ in one step. This method relies on the assumption that the gradient $\partial\omega_r/\partial\lambda$ is less sensitive to error than the resonance frequency itself. This update equation can be applied iteratively, if necessary, to bring the resonator close enough to resonance for the gradient-descent algorithm to be applied.

The relationships between $\omega_r$, Q and $\lambda$ can be continually refined and updated by the control system as it operates. For example, when the controller detects that $\omega$ and $\omega_r$ coincide (through a small value of r and/or a small value the second term on the RHS of equation 3) it will be able to update its relationship between $\omega_r$ and $\lambda$, because $\omega$ will be known from the sensor 6 signal and $\lambda$ is a control parameter. Likewise, the minimum value of |r|, from equation 2 will then be 1/Q (if Q>>1, but it is not difficult to derive an exact relation if required) so Q at the current value of $\lambda$ is also found. As the frequency $\omega=2\pi nf_1$ changes, the relationships between $\omega_r$, Q and $\lambda$ can be continuously updated for the range of $\lambda$ explored by the change in $\omega$.

It is a fact that $\omega_r$ and Q may also be functions of parameters other than $\lambda$. For example, temperature may affect the resonance frequency. In this case, it may be advantageous to have other inputs (8 in FIG. 2) to the control system that monitor such additional variables. The effect of these variables can then be built into the model relationships for $\omega_r$ and Q to enable better estimates to be obtained. The control system can still update these relationships as described above, the only difference being that these relationships now involve $\lambda$ and the additional variables instead of just $\lambda$.

In practical implementations of the system, more than one harmonic of the vibration will usually be controlled. This is easily performed with the addition of one resonator per harmonic to be controlled, plus at least one additional sensor on each of the resonators. (The sensor 5 on the structure can be used to determine the vibration at all of the harmonics to be controlled, whereas a separate sensor is needed on each of the resonators). With the processing of the signals described above, the control of each resonator is largely independent.

It may be possible to have a single mechanical device that resonates at two or more independently controllable frequencies. As far as the control scheme is concerned, no modifications are required provided each control variable can independently control each frequency.

There is no difficulty in controlling more than one resonator attached to different points on the structure, tuned to the same or different frequencies, provided that sensors on the resonators and structure are provided for each mounting point.

It is also possible that the source generates more than one harmonic sequence of vibration. In this case, the set of fundamental frequencies, $f_1, f_2, \ldots f_n$ should be resolved either from a single sensor 6, or preferably from several sensors that measure separately the different fundamentals. The overall control scheme is unchanged, as each additional harmonic sequence can be handled independently by a separate bank of harmonic filters.

There is sometimes an advantage to combining an active control system with the adaptive resonator system described here. It often happens that one or two harmonics of a vibration are particularly strong, or are at an inconveniently low frequency. Fully active control of these harmonics may then be costly in terms of actuator size, and power consumption. It is therefore beneficial to tackle such awkward vibration components with an adaptive resonator system, and to clear up the remaining problems actively. It is easy to modify the performance of an active control algorithm such as those described in C B B Chaplin and R A Smith, U.S. Pat. No. 4,588,118, 1988 and S A Tretter, U.S. Pat. No. 5,091,953, 1992 to ignore particular harmonics, if desired, and to combine the two types of control system into a single controller.

I claim:

1. A noise or vibration control system for controlling noise or vibration from one or more sources comprising:

one or more self adaptive resonator means, attached to one or more points on a structure, whose resonance frequencies are adjustable by control signals;

sensor means on said resonator means, the structure, or both said resonator means and said structure that are used to determine tuning of the resonator means;

one or more sensor means on the source of vibration, the structure, or both said source of vibration and said structure that can be used to derive frequencies of various components of the vibration;

a control system that has as inputs output signal from the sensor means, and as outputs control signals to change the resonance frequencies of the resonator means, wherein the control system incorporates a control algorithm to tune the resonator means close to selected frequencies in the noise or vibration, and to keep them tuned as those frequencies drift or as other factors affecting the resonator means' performances change.

2. A system as in claim 1, including a combination of tracking filters, harmonic filters, or Fourier transformation in order to discriminate against unwanted components in the sensor means inputs to the control system.

3. A system as in claim 1, wherein the control system uses models of the resonator means in the control algorithm.

4. A system as in claim 3 wherein the control system updates and refines the models of the resonator means as it operates.

5. A system as in claim 1, wherein the control system aims either to minimize or to maximize quantities that are proportional to a moduli of input impedances of the resonator means.

6. A system as in claim 5 wherein the control system uses a gradient descent algorithm.

7. A system as in claim 3 wherein the control system uses measurement-based one-step algorithm.

8. A system as in claim 3, wherein additional sensor means that monitor other parameters affecting performance of the resonator means form inputs to the control system.

9. A noise or vibration control system for controlling noise or vibration from one or more sources comprising one or more self adaptive resonator, attached to one or more points on a structure, whose resonance frequencies are adjustable by control signals;

a plurality of sensors on said resonator, said structure, or both, that are used to determine tuning of the resonator; and a control system having as inputs outputs from said sensors, and as outputs control signals to change the resonance frequencies of the resonators wherein the control system incorporates an algorithm to tune the resonators close to selected frequencies in the noise or vibration, and to keep them tuned as those frequencies drift, wherein said control system aims either to minimize or to maximize quantities that are proportional to a modulus of input impedances of the resonator means.

10. A system as in claim 9 wherein the control system uses models of the resonator means in the control algorithm.

11. A system as in claim 10 wherein the control system updates and refines the models of the resonator means as it operates.

12. A system as in claim 9 wherein the control system uses a gradient descent algorithm.

13. A system as in claim 10 wherein additional sensor means that monitor other parameters affecting the performances of the resonator means form inputs to the control system.

14. A noise or vibration control system for controlling noise or vibration from one or more sources comprising, one or more adaptive resonator means attached to one or more points on a structure, whose resonance frequencies can be adjusted by control signals, sensor means on the said resonator means and/or the structure that are used to determine the tuning of the resonator means, and a control system that has as inputs, the sensors, and as outputs, control signals to change the resonance frequencies of the resonator means wherein the control system incorporates an algorithm to tune the resonator means close to selected frequencies in the noise or vibration, and to keep them tuned as those frequencies drift (or as other factors affecting the resonator means' performances change). This control system is combined with an active-control system (plus its sensors and actuators) whose performance is designed to complement the resonator means in reducing noise or vibration in the structure.

\* \* \* \* \*